(12) United States Patent
Cairns

(10) Patent No.: US 7,990,574 B2
(45) Date of Patent: Aug. 2, 2011

(54) METHOD AND SYSTEM FOR CONVERTING A DOCUMENT

(75) Inventor: Glen Cairns, Coquitlam (CA)

(73) Assignee: Eastman Kodak Company, Rochester, NY (US)

(*) Notice: Subject to any disclaimer, the term of this patent is extended or adjusted under 35 U.S.C. 154(b) by 1046 days.

(21) Appl. No.: 11/880,380

(22) Filed: Jul. 20, 2007

(65) Prior Publication Data

US 2009/0021754 A1    Jan. 22, 2009

(51) Int. Cl.
*G06F 15/00*    (2006.01)

(52) U.S. Cl. .......... 358/1.9; 358/517; 358/518; 358/1.2; 382/242; 382/291; 382/286; 382/217; 382/213; 345/619; 345/655; 345/621; 345/622; 345/623; 345/624; 345/626

(58) Field of Classification Search .................. 358/1.9, 358/1.2, 517, 518; 382/242, 291, 286, 217, 382/213; 345/433, 619, 621–624, 626, 655, 345/681

See application file for complete search history.

(56) References Cited

U.S. PATENT DOCUMENTS

| | | | | |
|---|---|---|---|---|
| 5,926,185 A | * | 7/1999 | Vyncke et al. | 345/619 |
| 6,344,903 B1 | * | 2/2002 | Derhak et al. | 358/1.9 |
| 7,805,668 B2 | * | 9/2010 | Muramoto | 715/209 |
| 2002/0193956 A1 | * | 12/2002 | Van de Capelle et al. | 702/81 |
| 2005/0240858 A1 | * | 10/2005 | Croft et al. | 715/500 |
| 2005/0262430 A1 | * | 11/2005 | Croft | 715/507 |
| 2005/0280847 A1 | | 12/2005 | Cairns et al. | |
| 2010/0085583 A1 | * | 4/2010 | Cairns | 358/1.2 |

FOREIGN PATENT DOCUMENTS

| | | |
|---|---|---|
| EP | 971 309 A2 | 1/2000 |
| EP | 1 111 543 A2 | 6/2001 |
| EP | 1111543 A2 * | 6/2001 |
| EP | 1 143 381 A2 | 10/2001 |
| EP | 1 732 308 A2 | 12/2006 |
| WO | WO 2005/106797 A1 | 11/2005 |

* cited by examiner

*Primary Examiner* — Chan S Park
*Assistant Examiner* — Jacky X Zheng
(74) *Attorney, Agent, or Firm* — Nelson Adrian Blish

(57) ABSTRACT

A printing system includes a converter for replacing graphic elements of a color matched document (104). Conversion replaces original elements (2-4) with replacement elements (21-24, 40-42) having modified transparency attributes so that overprinting elements that overlap areas (10-15) appear as intended when subjected to color matching.

13 Claims, 11 Drawing Sheets
(10 of 11 Drawing Sheet(s) Filed in Color)

METHOD AND SYSTEM FOR CONVERTING A DOCUMENT

CROSS REFERENCE TO RELATED APPLICATIONS

Reference is made to commonly-assigned U.S. patent application Ser. No. 11/122,090 (U.S. Patent Application Publication No. 2005/0280847), filed May 5, 2005, entitled SYSTEM AND METHODS FOR COLOR MATCHING OVERPRINTED DOCUMENTS, by Cairns et al., the disclosure of which is incorporated herein.

FIELD OF THE INVENTION

The present invention relates in general to document images, and in particular to replacing certain graphic elements with a plurality of replacement elements that produce visually similar results when processed.

BACKGROUND OF THE INVENTION

In the field of imaging, document files can include vector graphic elements which represent the intended appearance of a document. Some documents include graphic elements that overlap such that the overlapping colors combine to produce a different color.

A document has a native format, such as a document produced by word processing, artwork, or photo software. A document can also be translated into a portable format that can be used by viewing, editing, or printing software. Printing systems typically receive portable documents which may be processed prior to printing by a target printing device. Processing may include many steps including, for example, preflight, color matching and trapping.

Portable documents can be in a variety of formats, such as raster formats and vector formats. Vector formats, exemplified by Adobe® PDF or Adobe® PostScript®, define a document in terms of an ordered list of graphic elements that represent a page image based on attributes defined by an imaging model (e.g. opaque and transparent). When printing a PDF document for example, elements are painted in order on the page to create a rendering of the document. Documents can have many pages with sets of elements representing the intended image for each page. For simplicity, the remainder of the description assumes a file (or stream of data) for a document, the file including graphic elements representing an intended image of a single page of the document.

Exemplary graphic element types include text, path (shape), and image (raster) types. The color painted for a document at any point (e.g. pixel in the rendered image) is affected by elements configured to paint there, the element painting order, the element attributes and the imaging model. In some cases (e.g. elements configured to knockout color), the element painting last defines the color. Other cases (e.g. elements configured to overprint color) are more interesting in that more than one element may contribute color. This is particularly relevant when two elements overlap at the point of interest. Color space, overprint and transparency attributes for overlapping elements can also, for example, affect the color at the overlap point.

Commonly-assigned U.S. Patent Application Publication No. 2005/0280847 (Cairns et al.) describes a method for processing document files including overlapping elements configured to overprint, and is incorporated by reference herein. In summary, the prior application discloses converting a document by retaining original elements while adding a graphic element to the document to represent the combined color of elements that overlap in the area. The application also discloses processing the converted file to, for example, alter the color to match a target device's color space.

While this approach produced the desired results, there is more complexity than desired in calculating the overlapped overprint areas and combining colors.

SUMMARY OF THE INVENTION

The present invention provides simplified systems and methods for converting a document into a portable format by replacing certain graphic elements with a plurality of replacement graphic elements so that the converted document is similar in appearance to the original. Further, when the converted document is subjected to processing, such as color matching for a target device, the color of an area in the target color space is similar to the intended color of the corresponding area in the source (original) color space. This includes areas where graphic elements overlap.

According to one aspect of the invention, graphic elements configured to overprint and paint subtractive process colorants (e.g. cyan, magenta, yellow, and black or (CMYK)) opaquely are replaced with at least two graphic elements having the same geometry and position on the page. One is configured to paint with modified colorant values and lighten transparency blending to allow background colorants, not painted by the original element, to be visible. The second is configured to paint with darken transparency blending to enable the colorants painted by the original element to be visible. When color matched, small perturbations in colorant values that might otherwise cause a large shift in color appearance for overlapped areas are avoided due to the transparency attributes.

According to another aspect of the invention, a graphic element configured to overprint and paint process colorants transparently is replaced similar to above except that the replacement elements are placed in a transparency group having the blending mode and opacity of the original element to achieve a similar effect as above.

According to yet another aspect of the invention, for documents including elements painting spot colors, every graphic element is replaced with a combination of process and spot elements, one for each spot color painted by the document. Replacement process elements, similar to above, are painted first while preserving the relative order of their original counterparts. Replacement spot color elements, for each spot color, are painted in per-spot color transparency groups while preserving the relative order of their original counterparts.

Original elements painting a spot color are replaced with a spot color element painting the original value. Original elements not painting a spot color are replaced with an element, or no element, to preserve knockout and transparency effects of the original element. The per-spot color transparency groups are configured to use the multiply blending mode with isolation. This allows replacement spot color elements for a spot color to combine their color together before combining their color with other elements.

If a target device paints the spot color, the multiply transparency group with the isolated property produces the desired result for that spot color channel. If a target device paints a process recipe for the spot color, the multiply blending causes the process recipe contributions from a transparency group to combine with the process element contributions from the background and with the process recipe contributions from other spot color transparency groups that are converted to process.

In all of these cases, target color in the overlapped areas may not be identical to the methods described in U.S. Patent Application Publication No. 2005/0280847 since the prior method computes a new color for an overlapped area which is independently color matched whereas the present method color matches multiple overlapping original colors and then combines them during rendering. The small variations between target colors in overlapped areas for the prior and present methods will likely be unnoticeable for most print buyers. For discerning print buyers a choice between prior and present methods can be offered so that the tradeoff between speed and accuracy can be made.

These and other aspects of the present invention are illustrated in the detailed description of the invention.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

A document file can be processed by a converter to produce a new file, for example, the system described in U.S. Patent Application Publication No. 2005/0280847. The new file can be color matched or otherwise processed, as part of the conversion or as a later step, to improve the printability of the file while striving to preserve the intent of the original document file.

Figure 1:
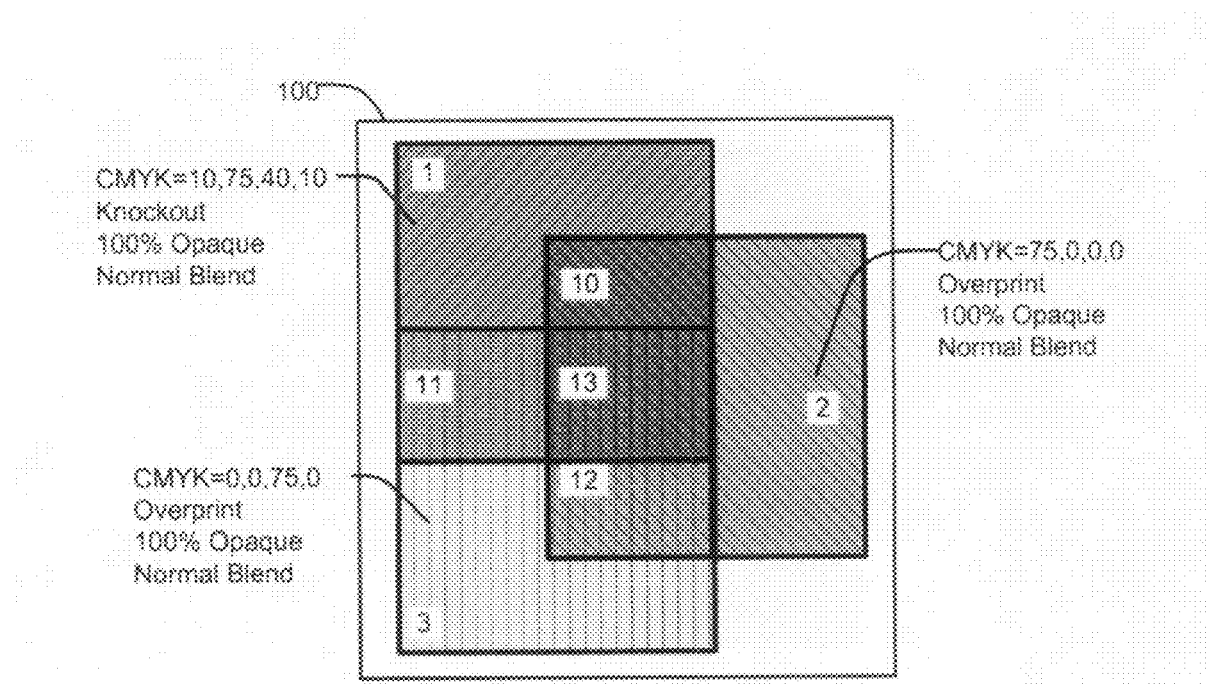
FIG. 1 is a diagram illustrating a rendering of an exemplary document including opaque overprinting graphic elements.

FIG. 1 is a diagram illustrating a rendering of exemplary document 100 including opaque overprinting graphic elements. Three square, filled path graphic elements 1-3 are illustrated with overlapping areas 10-13. Elements 1-3 paint in a source device CMYK color space. Element 1 paints a rose color with CMYK tints of 10%, 75%, 40% and 10% respectively and is configured to knockout all background color. Element 1 is depicted, for illustration purposes only, with a right diagonal fill pattern to more readily identify its boundaries. Element 2 paints second with CMYK tints of 75%, 0%, 0%, and 0% respectively and is configured to overprint opaquely (e.g. so that it only knocks out cyan color from the background). Element 2 is depicted with a left diagonal fill pattern to more readily identify it. Element 3 paints third with CMYK tints of 0%, 0%, 75% and 0% respectively and is configured to overprint opaquely (e.g. only knocks out yellow color). Element 3 is depicted with a vertical fill pattern to more readily identify it.

Overlap area 10 illustrates where element 2 overlaps only element 1 with an intended blue-grey appearance. Overlap area 11 illustrates where element 3 overlaps only element 1 with an intended orange appearance. Overlap area 12 illustrates where element 3 overlaps only element 2 with an intended green appearance. Overlap area 13 illustrates an area where elements 1-3 overlap with an intended grey appearance.

Figure 2:
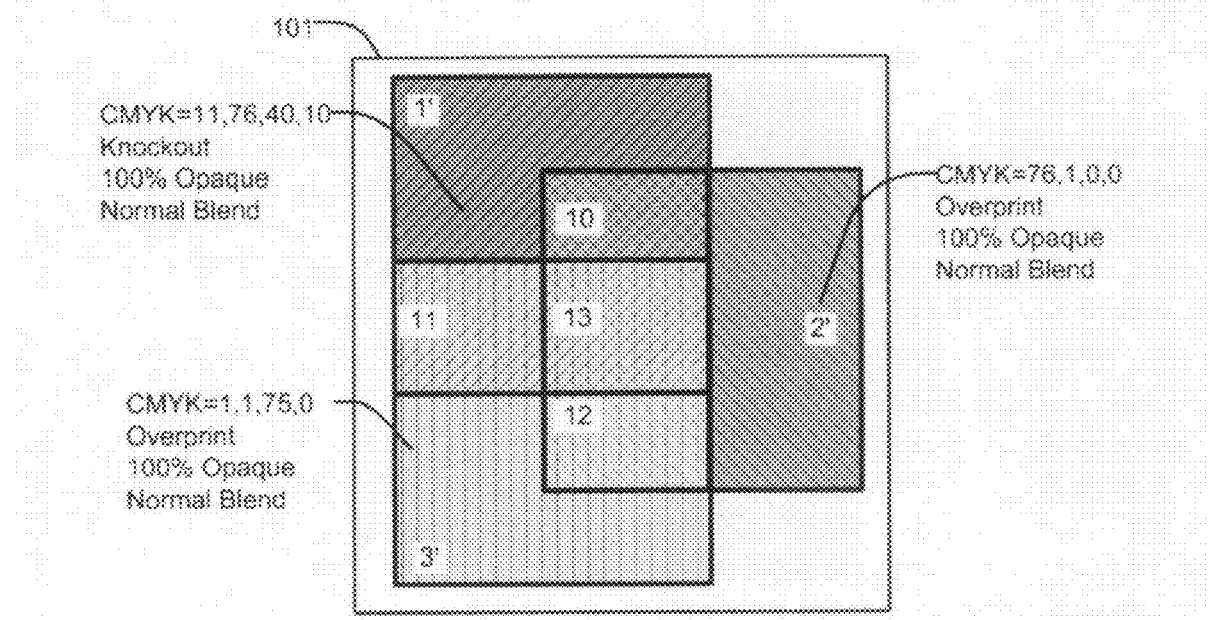
FIG. 2 is a diagram illustrating a rendering of an exemplary color matched document according to a prior art method.

FIG. 2 is a diagram illustrating a rendering of exemplary color matched document 101, derived from document 100, according to a prior art method. For example, assume that a contrived result of color matching is to slightly enrich (e.g. 1%) the cyan and magenta colorants for all tinted (e.g. not white) elements. The figures have been prepared using Adobe® Illustrator® CS3 Extended and rendering them using Adobe® Photoshop® CS3 Extended. Color matching has been simulated by altering the cyan and magenta tints in Illustrator® prior to rendering.

Areas of color matched document 101, corresponding to color matched original elements 1'-3' alone appear very similar to corresponding areas of document 100 since the color shift is very small. However, overlap areas 10-13 of color matched document 101 have significantly different colors than that intended by corresponding areas of document 100. This is due to overprint rendering rules that cause, for example, the 1% cyan tint of color matched original element 3' to knockout the 76% tint of color matched element 2' in overlap area 12, resulting in a hue change from green to yellow. Similar effects occur in each of the overlap areas 10-13.

Figure 3:
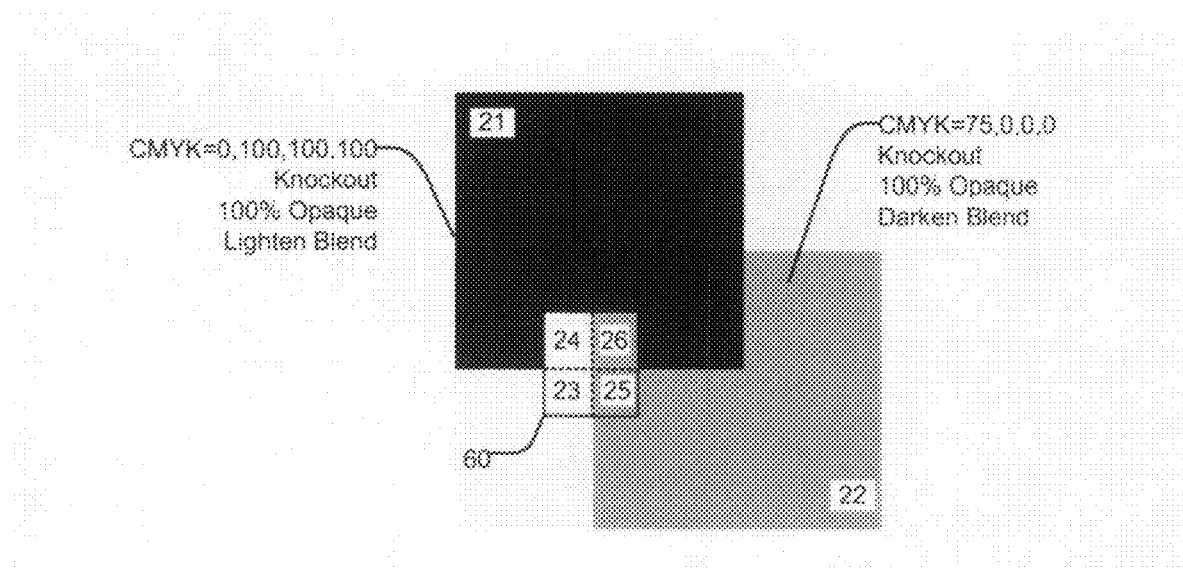
FIG. 3 is a diagram illustrating exemplary replacement elements for an opaquely overprinting element according to an embodiment of the present invention.

FIG. 3 is a diagram illustrating exemplary replacement elements for an opaquely overprinting element according to an embodiment of the present invention. In particular, replacement elements 21 and 22 for original element 2 are depicted. For clarity, they are depicted with disjoint positions. In practice, they are actually configured with the same geometry and position as original element 2 and with replacement element 22 painting after replacement element 21 (as shown) with the pair retaining the same relative painting order as original element 2. Note that replacement elements for original element 3, which overprints, are also needed, but not shown.

Replacement element 21 is based on original element 2 but with its colorants altered, its transparency blending mode changed to lighten, and its overprint setting disabled. Colorants for replacement element 21 are configured to paint 100% tint for each colorant not painted by original element 2 and to paint 0% tint for each colorant painted by original element 2 (e.g. CMYK=0%, 100%, 100%, 100%). For a transparent imaging model, a lighten blend can allow selection of the lighter of the foreground and background colorant tints. In other words, replacement element 21 will preserve the overprint effects of original element 2 by:

- allowing any background tint for a colorant that is not painted by element 2 to be visible; and
- masking any background tint painted for a colorant painted by element 2.

Replacement element 22 is based on original element 2 but with its transparency blending mode changed to darken, with colorants unchanged, and its overprint setting disabled. For a transparent imaging model, a darken blend can allow the darker of the foreground and background colorant tints to be selected. Since replacement element 21 masked off any background tints in colorants painted by original element 2, the non-zero tints of original element 2 are preserved.

Transparency models are typically described in terms of additive color spaces while printing colorants are subtractive. The preceding description is believed to be valid for a raster image processor (RIP) observing a transparent imaging model. However, tests have shown that in some cases a white background element, corresponding to a white page upon which subtractive colorants are painted, is required to produce the desired results. For example, white background element 60 is depicted as a small square painting before both replacement elements 21 and 22. White background element 60 results in distinct areas: replacement element 23 (white background only), replacement element 24 (replacement element 21 overlapping white background element 60), replacement element 25 (replacement element 22 overlapping white background element 60), and replacement element 26 (replacement element 22 overlapping both replacement element 21 and white background element 60). Clearly, replacement elements 23-26 indicate the desired results whereas the dark areas corresponding to replacement element 21, either by itself or overlapped by replacement element 22, appear incorrect (e.g. dark). Thus, in some embodiments, at least one additional element background element can be added to the document file to represent the white background of the target printing medium (e.g. entire page). In preferred embodiments, this background element is configured to be white, painting 0% tint in each colorant painted by the document.

Figure 4:
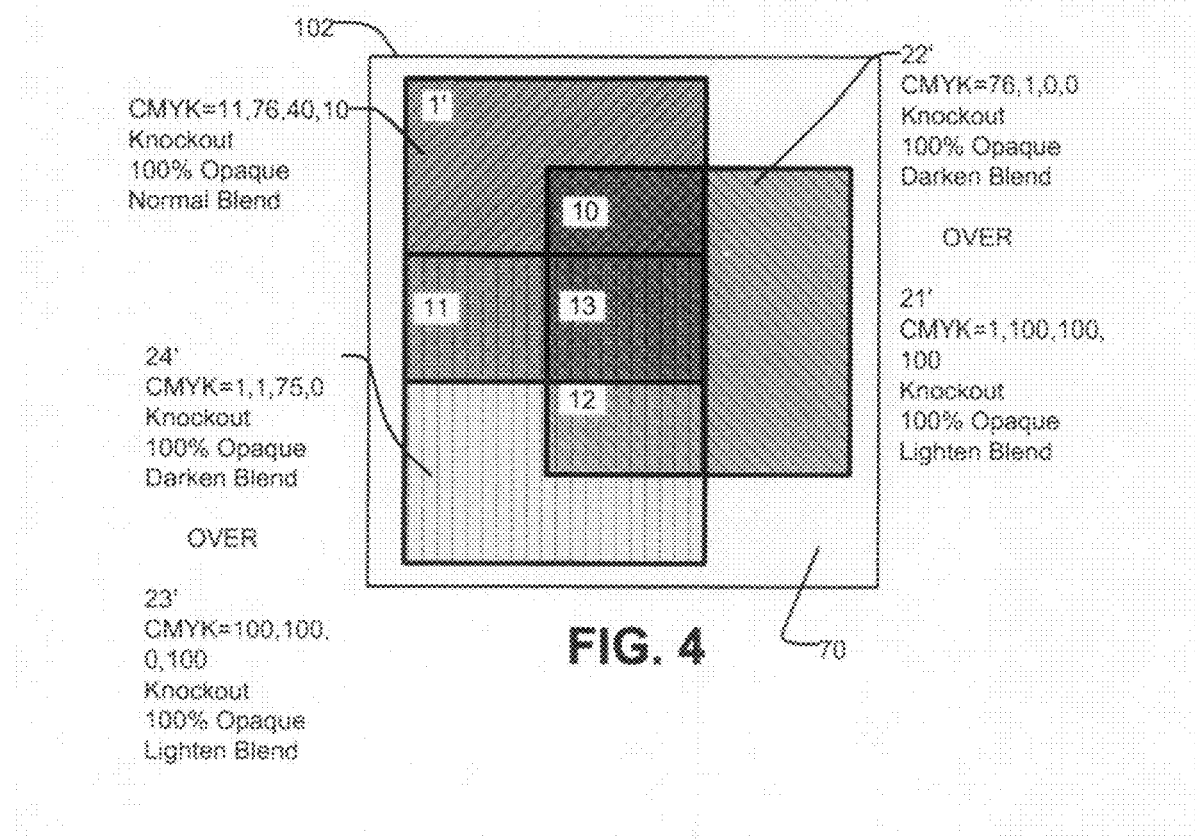
FIG. 4 is a diagram illustrating a rendering of an exemplary color matched document according to the present invention.

FIG. 4 is a diagram illustrating a rendering of exemplary color matched document 102, derived from document 100 after conversion with replacement elements, according to the present invention. Additional white background element 70 is depicted as painting first, followed by:

- color matched original element 1' (color matched element 1);
- color matched replacement element 21' (replacement element 21);
- color matched replacement element 22' (replacement element 22);
- color matched replacement element 23' (color matched lighten replacement element 23 for original element 3); and
- color matched replacement element 24' (color matched darken replacement element 24 for original element 3).

Non-overlapped areas of original elements 1-3 have original colorant tints enriched by the color matching amounts. Overlap areas 10-13 have similar color appearance to those intended, as in FIG. 1. The following values, determined by Photoshop® renderings indicate the degree of similarity in color appearance for the color managed elements in the overlap areas (matched vs. original):

- Overlap area 10: CMYK=76, 76, 40, 10 vs. 75, 75, 40, 10
- Overlap area 11: CMYK=11, 76, 75, 10 vs. 10, 75, 75, 10
- Overlap area 12: CMYK=76, 1, 75, 10 vs. 75, 0, 75, 10
- Overlap area 13: CMYK=76, 76, 75, 10 vs. 75, 75, 75, 10

Figure 5:
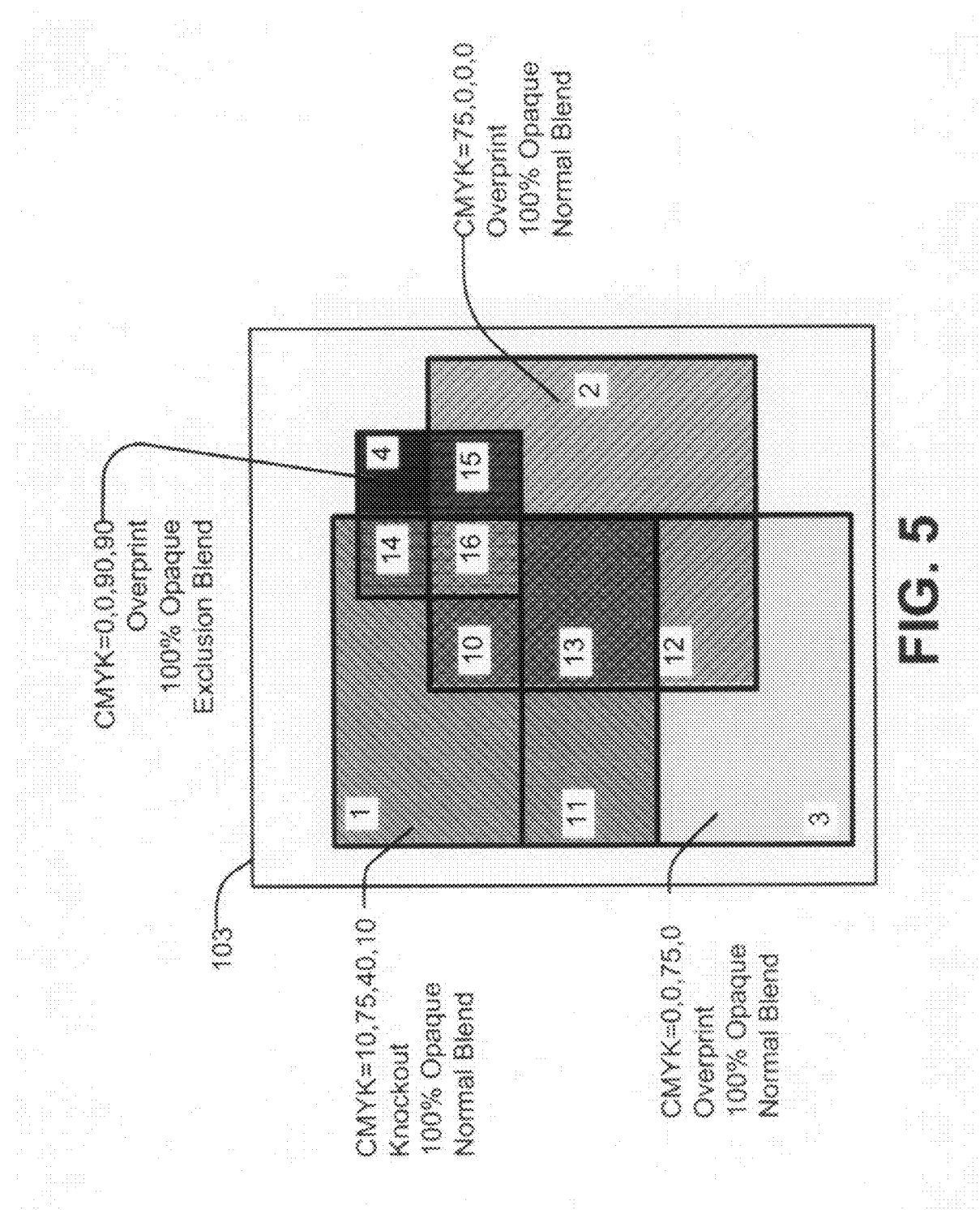
FIG. 5 is a diagram illustrating a rendering of an exemplary document including transparent overprinting graphic elements.

FIG. 5 is a diagram illustrating a rendering of exemplary document 103 including transparent overprinting graphic elements. FIG. 5 is the same as document 100 with graphic original element 4 added. Original element 4 is depicted with a vertical fill pattern, instead of original element 3, to more readily identify it. Element 4 paints fourth in a dark blue color with CMYK tints of 0%, 0%, 90%, and 90% respectively and is configured to overprint transparently, with opacity of 100% using an exclusion blend mode. For a transparent imaging model, an exclusion blend can result in a contrast-limited absolute value difference between foreground and background colorant tints.

Overlap area 14 illustrates where original element 4 overlaps only original element 1 with an intended teal appearance. Overlaps area 15 illustrates where original element 4 overlaps only original element 2 with an intended purple appearance. Overlap area 16 illustrates where original element 4 overlaps both original elements 1 and 2 with an intended light grey appearance.

Figure 6:
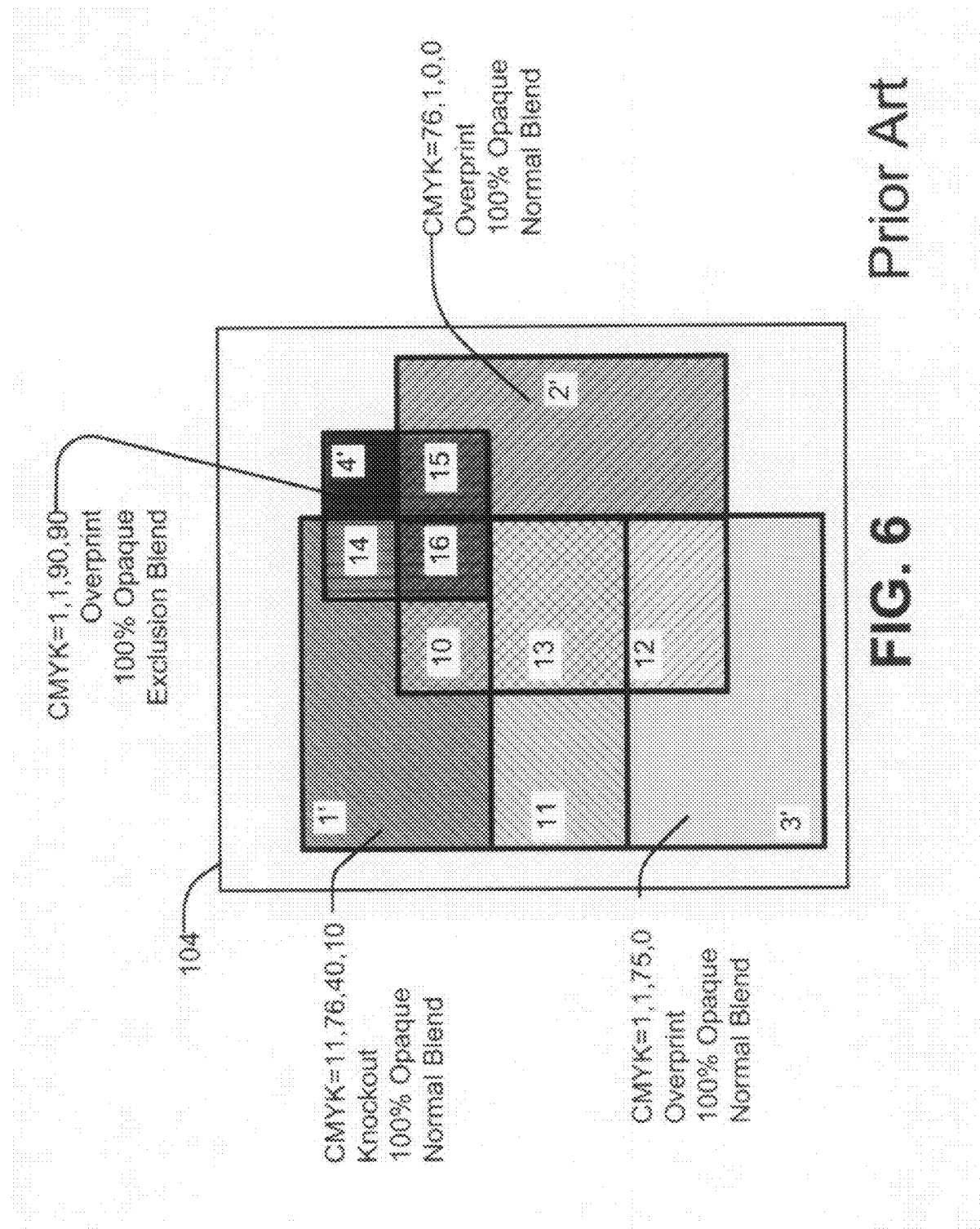
FIG. 6 is a diagram illustrating a rendering of an exemplary color matched document according to a prior art method.

FIG. 6 is a diagram illustrating a rendering of exemplary color matched document 104, derived from document 103, according to a prior art method. For example, assume the same 1% color shift in cyan and magenta channels as described above. Similar to color matched document 101, color matched document 102 includes color matched original elements 1'-3' and also includes color matched original element 4' with enriched cyan and magenta colorants. Overlap areas 14-16 have all suffered undesirable hue shifts.

Figure 7:
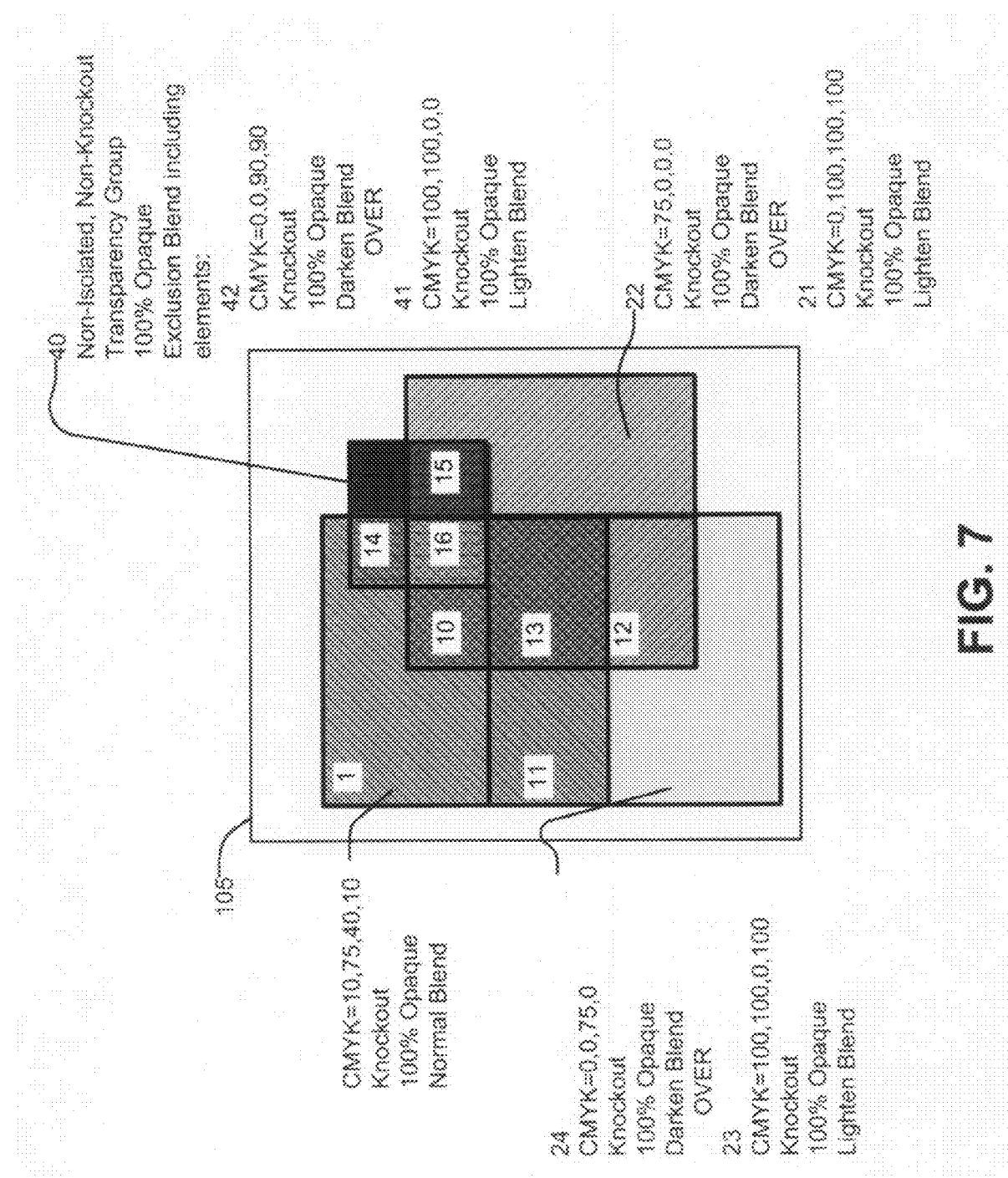
FIG. 7 is a diagram illustrating a rendering of an exemplary converted document including replacement elements for a transparent overprinting element according to the present invention.

FIG. 7 is a diagram illustrating a rendering of exemplary converted document 105, derived from document 103 with replacement elements for transparent overprinting elements according to the present invention. According to one aspect of the invention, a method similar to that described above for overprinting non-transparent elements (FIG. 3) is performed for elements configured to overprint with transparency. One difference in the method involves grouping the replacement elements in a replacement transparency group which is configured to paint with transparency attributes of the original element but with non-isolated and non-knockout settings. For example, replacement elements 41 and 42 are painted as part of replacement transparence group 40. They are replacements for replacement element 4 with the same geometry and position and with element 42 painting after replacement element 41 with the pair retaining the same painting order as original element 4.

Replacement element 41 is based on original element 4 but with its colorants altered and its transparency blending mode changed to lighten. Colorants for replacement element 41 are configured to paint 100% tint for each colorant not painted by original element 4 and to paint 0% tint for each colorant painted by original element 4 (e.g. CMYK=100, 100, 0, 0). Replacement element 42 is also based on original element 4 but with its transparency blending mode changed to darken and with colorants unchanged. Replacement elements 41 and 42 are also configured to disable overprinting.

The transparency attributes for replacement transparence group 40 (e.g. 100% opacity and exclusion blending mode) preserves the transparency effect of original element 4. The non-isolated setting ensures that the color of the group will blend with the background. The non-knockout setting ensures that the group will not knockout the color produced by other groups or layers of the document.

Figure 8:
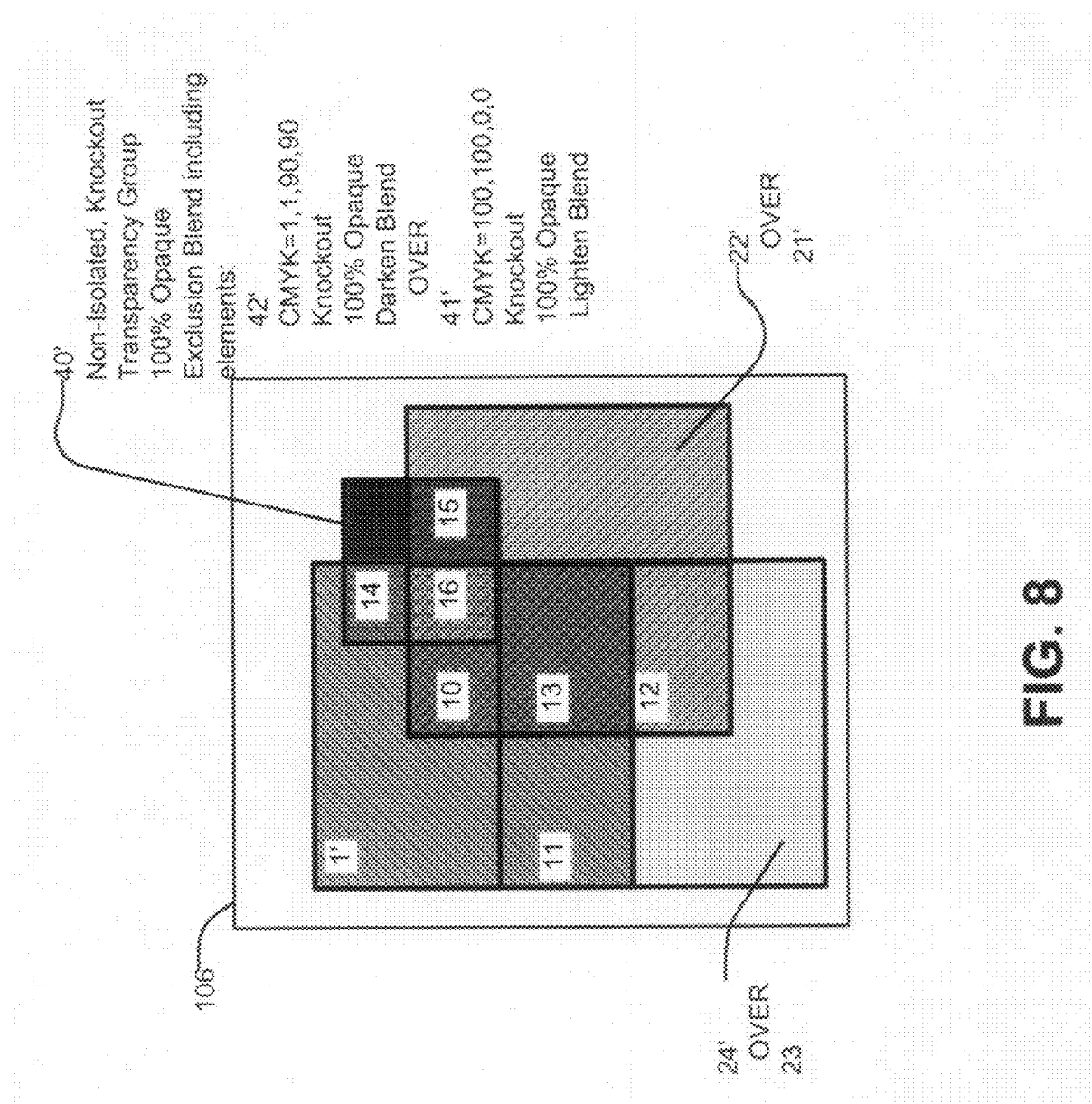
FIG. 8 is a diagram illustrating a rendering of an exemplary color matched converted document according to the present invention.

FIG. 8 is a diagram illustrating a rendering of exemplary color matched converted document 106, derived from converted document 105, according to the present invention. Original and replacement elements for original elements 1-3 have been color matched similar to the description for FIG. 4. Replacement transparence group 40, representing original element 4, has been converted to color matched replacement group 40' wherein cyan and magenta tints for replacement element 42 have been enriched by 1%. According to one embodiment, replacement elements with lighten transparency (e.g. replacement element 41) are identified so that they are not subsequently adjusted during color matching. One can see that the intended appearance of overlap areas 14-16 and non-overlapped portions of replacement transparency group 40 are similar to those intended and shown in FIG. 5.

Figure 9:
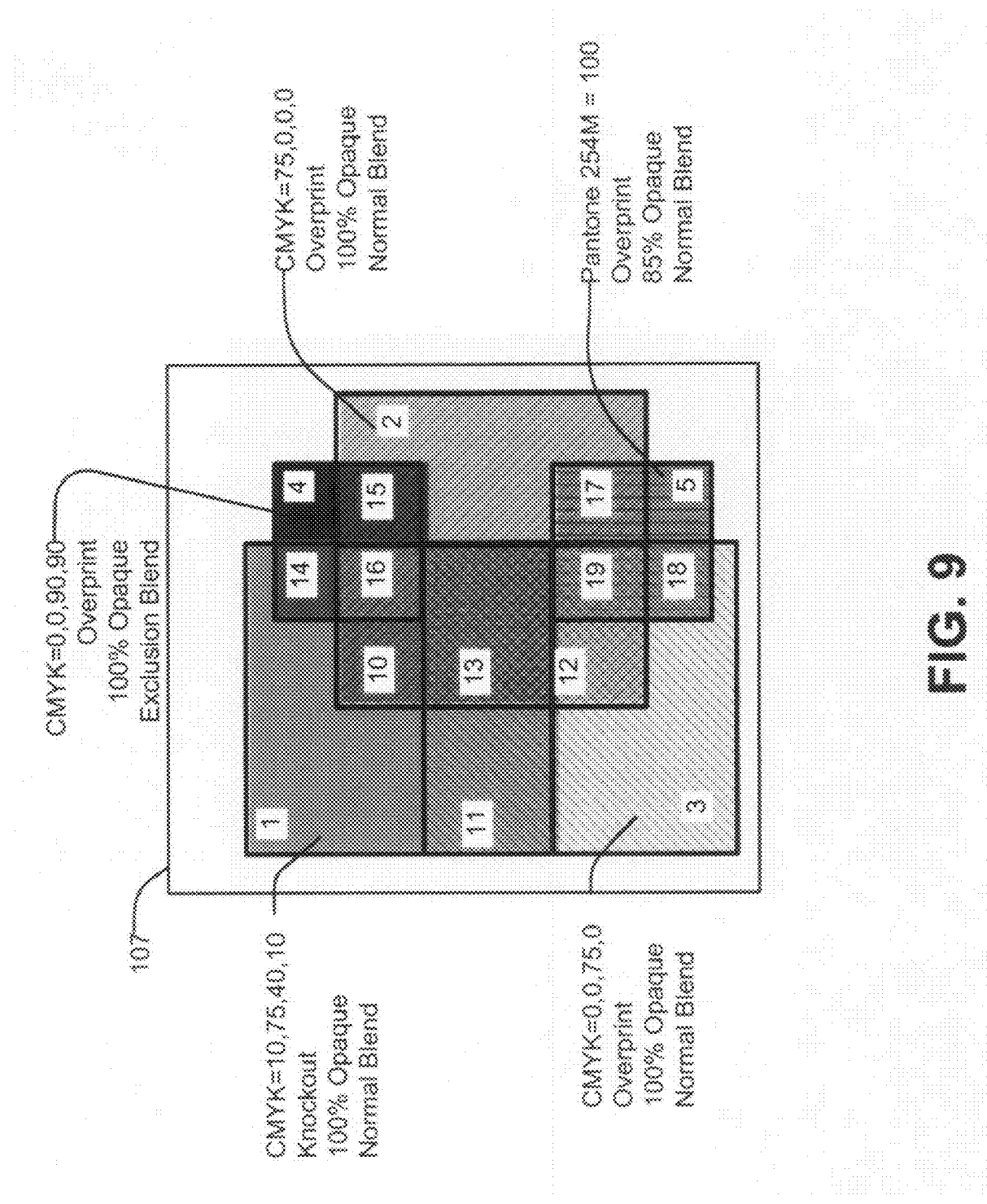
FIG. 9 is a diagram illustrating a rendering of an exemplary document including overprinting spot color graphic elements.

FIG. 9 is a diagram illustrating a rendering of exemplary document 107 including overprinting spot color graphic elements. FIG. 9 is the same as document 103 of FIG. 5 with graphic original element 5 added. Elements depicted with fill patterns now include original element 2 with a left diagonal fill, original element 3 with a right diagonal fill and original element 5 with a vertical fill. Original element 5 paints fifth in a purplish Pantone 254 M spot color tint of 100% and configured to overprint transparently with opacity of 85% using a normal blend mode.

The appearance of original element 4 depicted in FIG. 9 is not as intended due to rendering limitations in the tools used to produce the figure. Overlap areas 17 and 18 as shown appear as different shades of the spot color. This is not intended color appearance. In particular, the rendering tools appear to first convert the spot color tint to a process recipe of CMYK=50%, 100%, 0%, 0% and overprint the cyan and yellow tints of original elements 2 and 3. The intended color appearance of overlap area 17, corresponding to element 5 overlapping only original element 2, is dark blue. The intended color appearance of area 18, corresponding to original element 5 overlapping only original element 3, is orange-red. The intended color of overlap area 19, corresponding to original element 5 overlapping both original elements 2 and 3, is green-grey.

Figure 10B:
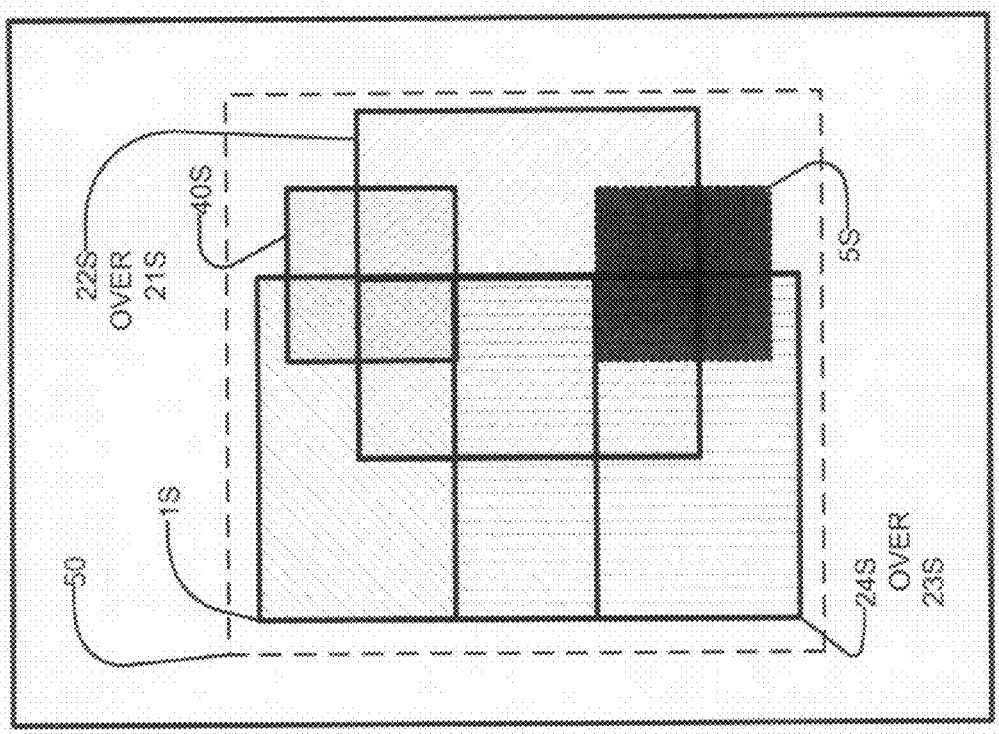
FIGS. 10A and 10B are diagrams illustrating exemplary replacement process and spot elements for an document painting spot colors according to an embodiment of the present invention.
Figure 10A:
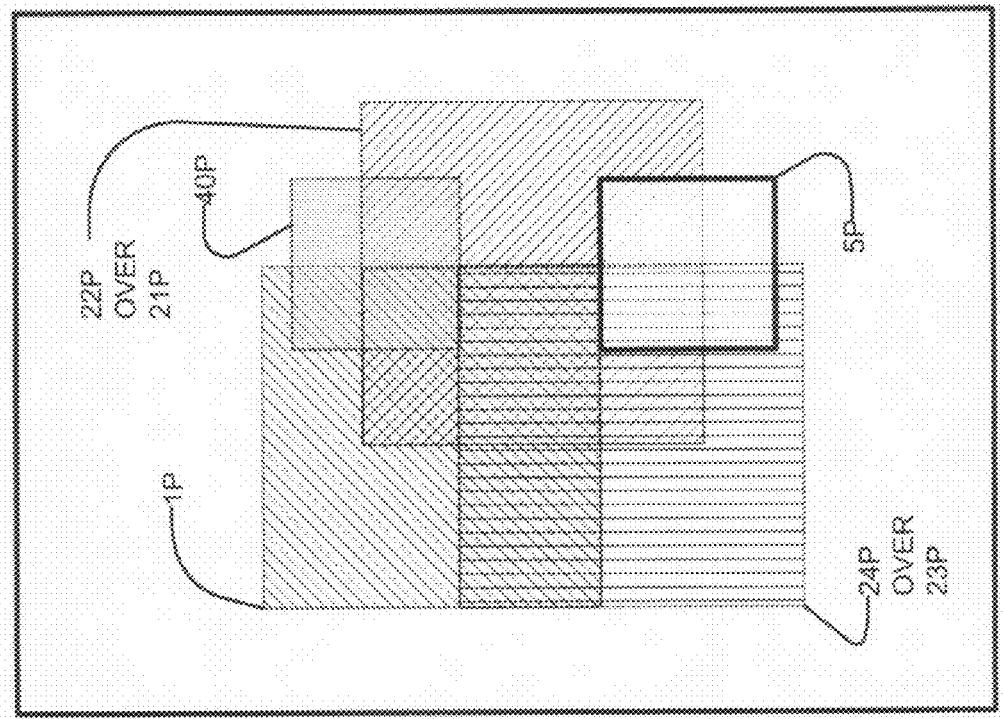

FIGS. 10A and 10B are diagrams illustrating exemplary replacement process and spot elements for a document overprinting spot colors according to an embodiment of the present invention. According to one aspect of the invention, if a document paints any spot colors, consideration is given to create replacement process and spot elements for every element painted for the document. In particular, for each element in the original document:

Create a replacement process element:
  Paint only process colorants painted by the original element.
    If no process colorants were painted by the original (e.g. painted only spots), then at least one process colorant must be painted with tint 0% to preserve knockout and transparency behavior of the original element.
  Retain original graphic state parameters including geometry, position, overprint and transparency attributes.
Create a replacement spot color element for each spot color painted by the document:
  Paint only the single spot color with the tint painted by the original element for that spot color.
    If the spot color is not painted by the original element (e.g. process element or other spot color), then an element must still be created that paints with tint 0% in the spot color to preserve knockout and transparency effects.
    If overprint in the original element is enabled and transparency disabled and the spot color is not painted by the original element, then a spot element must not be created at all—it must be omitted from the replacement elements. Equivalently, create a replacement spot element only if the original element paints the spot or paints transparently or paints to knockout.
  Retain original graphic state parameters including geometry, position, transparency attributes, but disable overprint.
  Convert non-white preserving or non-separable transparency blend modes of an original element to normal blend mode for the replacement element if dictated by imaging model rules (e.g. Adobe transparent imaging model identifies difference and exclusion modes thusly).

Replacement process and spot elements are configured to paint as follows:
  All replacement process elements are painted first, preserving the relative order of their original counterpart elements.
  Each replacement spot color element, of the same colorant, is configured as part of a per-spot color transparency group, preserving the relative order of their original counterpart elements. Each transparency group is configured to:
    Blend using the multiply blend mode.
    Paint in isolation of the background and other groups.

The effect of these replacements is to cause color contributions in process colorants from all elements, including knockout, overprint and transparency effects, to be included in replacement process elements that paint first. Second, the color contributions from all elements painting in a spot color channel are combined for the channel before the resultant color is combined with process elements and other spot color channels using color multiplication. In a transparent imaging model, multiplication can have the effect of darkening the background color by the foreground color.

Using this approach for a target device that paints with a spot color, only grouped replacement elements painting a spot color will contribute tints for that spot color channel in the device. Further, for a target device that paints the spot color using a process recipe, the multiplication causes the group's process equivalent tints to be combined with the replacement process elements that painted earlier.

FIG. 10A, based on original document 107 of FIG. 9, illustrates exemplary replacement process elements 1P, 21P-24P, 40P (including constituent elements 41P and 42P (not shown)). The replacement elements are depicted (without color) as being derived from a first conversion of original elements 1-4. Since these elements all painted only process colorants, the process replacements are the same as the originals or previously derived replacements. Replacement process element 5P is depicted as the only new process element. It is configured to paint last in the replacement process element stack with a CMYK tint of 0%, 0%, 0%, and 0%. It is also configured to overprint transparently with opacity of 85% using a normal blend mode, consistent with original element 5.

FIG. 10B, based on original document 107, illustrates exemplary Pantone 254M spot color replacement elements 1S, 21S-24S, and 40S. The replacements are depicted as being derived from a first conversion of original elements 1-4. They all paint with Pantone 254M colorant at 0% tint and otherwise with original graphic settings except with overprint disabled. In addition, replacement spot element 5S, being equivalent to original element 5 except with overprint disabled, is also depicted. These replacement spot elements are part of Pantone 254M transparency group 50, illustrated by dashed line for illustrative clarity.

Figure 10C:
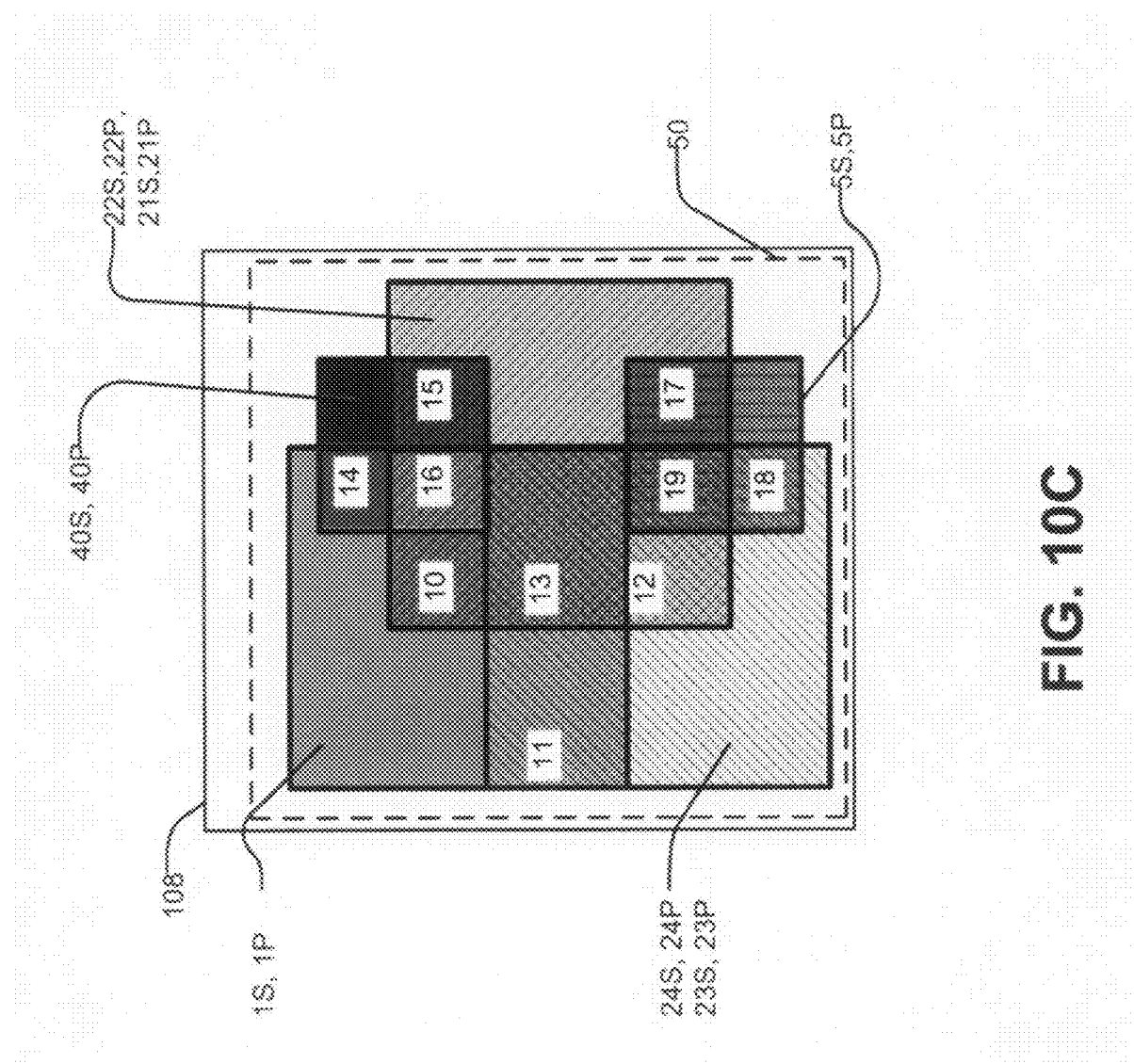
FIG. 10C is a diagram illustrating a rendering of an exemplary converted document including replacement elements according to the present invention.

FIG. 10C is a diagram illustrating a rendering of exemplary converted document 108, derived from document 107 of FIG. 9, including replacement process and spot elements according to the present invention. In particular, replacement process elements (1P, 21P-24P, 40P, and 5P) of FIG. 10A are depicted along with Pantone 254M replacement transparency group 50 which includes replacement spot elements (1S-21S-24S, 40S, and 5S). In contrast with document 107, converted document 108 has a color appearance consistent with that intended, notably in overlap areas 17-19.

In one embodiment, creation of replacement process and spot color elements can occur first, based on the original elements. Creation of replacement elements for overprinting elements can then occur based on the replacement process elements.

Figure 11:
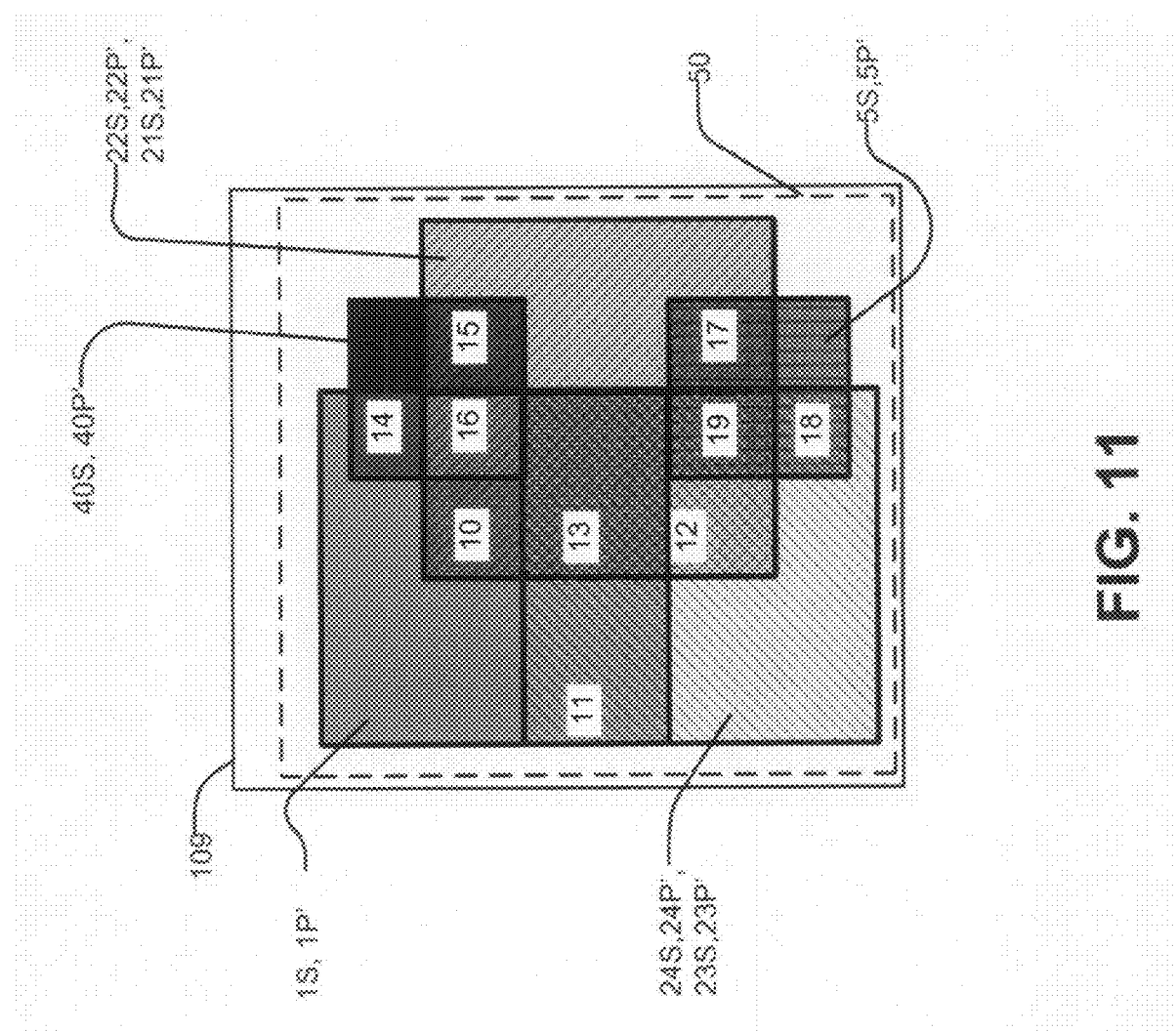
FIG. 11 is a diagram illustrating a rendering of an exemplary color matched converted document according to the present invention.

FIG. 11 is a diagram illustrating a rendering of exemplary color matched converted document 109, based on converted document 108, according to the present invention. Replacement process elements 21P'-24P' have been enriched as described above. The effect of color matched element 5P' is unnoticeable since it is configured to paint white with overprint and remains white after color matching. Note that replacement spot elements in group 50 are depicted as unchanged due to the target device being configured to paint Pantone 254M.

Figure 12:
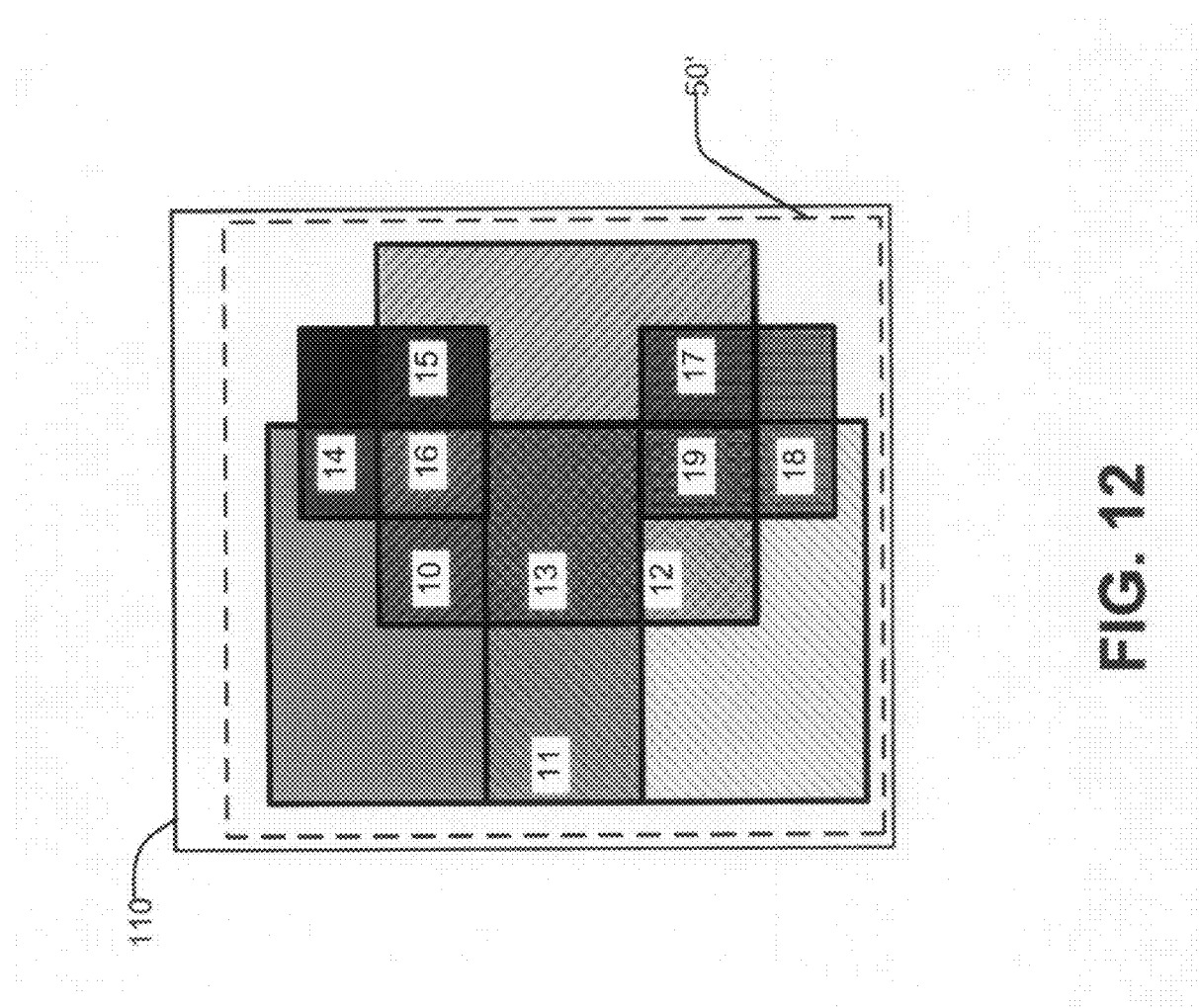
FIG. 12 is a diagram illustrating a rendering of an exemplary converted document, color matched to map spot color to process color, according to the present invention.

FIG. 12 is a diagram illustrating a rendering of exemplary converted document 110, based on document 108, color matched to map spot color to process color according to the present invention. This could occur, for example, if the target device is not configured to paint Pantone 254M. Document 110 is similar to color matched converted document 109 except that replacement spot elements in replacement transparency group 50 are converted to a process recipe. This could occur as a result of color matching for a target device to yield replacement group 50' (as shown) or replacement transparency group 50 could be preserved (not shown) and have its spot color converted during rendering. In particular, color matched replacement spot element 5S' paints CMYK with a tint of 50%, 100%, 0%, 0% whereas the color matched replacement spot elements (1S', 21S'-24S', and 40S'), still paint with a 0% tint in each process colorant channel. The multiplication blending results in a color appearance that is still close to that intended in original document 107.

According to one embodiment of the invention, creating process and spot color replacements can be performed first, followed by selective creation of replacement elements for overprinting process elements. According to one embodiment, elements painting additive colors (e.g. RGB) or device independent colors (e.g. Lab) can be treated as painting all subtractive process colorants and no spot colors when creating process and spot color replacements.

Embodiments of the present invention may comprise any medium which carries a set of computer-readable signals comprising instructions which, when executed by a computer processor, cause the computer processor to execute a method of the invention. Embodiments may be in any of a wide variety of forms. Embodiments may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The invention has been described in detail with particular reference to certain preferred embodiments thereof, but it will be understood that variations and modifications can be effected within the scope of the invention.

PARTS LIST 1 original element
2 original element
3 original element
4 original element
5 original element
1' color matched original element
1P replacement process element
1P' color matched replacement process element
1S replacement spot element
2' color matched original element
3' color matched original element
4' color matched original element
5P replacement process element
5P' color matched replacement process element
5S replacement spot element
10 overlap area
11 overlap area
12 overlap area
13 overlap area
14 overlap area
15 overlap area
16 overlap area
17 overlap area
18 overlap area
19 overlap area
21 replacement element
21' color matched replacement element
21P replacement process element
21P' color matched replacement process element
21S replacement spot element
22 replacement element
22' color matched replacement element
22P replacement process element
22P' color matched replacement process element
22S replacement spot element
23 replacement element
23' color matched replacement element
23P replacement process element
23P' color matched replacement process element
23S replacement spot element
24 replacement element
24' color matched replacement element
24P replacement process element
24P' color matched replacement process element
24S replacement spot element
25 replacement element
26 replacement element
40 replacement transparency group
40' color matched replacement group
40P replacement process group
40P' color matched replacement process group
40S replacement spot group
41 replacement element
42 replacement element
50 replacement transparency group
50' color matched replacement group
60 white background element 70 white background element
100 document
101 color matched document
102 color matched document
103 document
104 color matched document
105 document
106 color matched converted document
107 document
108 converted document
109 color matched converted document
110 converted document

The invention claimed is:

1. A method for converting a document including vector graphic elements, the method comprising:
   obtaining an ordered list of graphic elements from the document;
   selecting an element from the list;
   removing the selected element from the list;
   adding at least one replacement element for the selected element wherein adding includes:
      configuring the at least one replacement element with the same geometry and position as the selected element;
      configuring transparency attributes associated with the at least one replacement element;
      creating a replacement document based on the modified list;
   wherein selecting comprises selecting an element configured to overprint in a subtractive color space;
   wherein selecting comprises selecting an element configured to paint opaquely; and
   wherein adding the at least one replacement element comprises:
      configuring a first replacement element to paint a zero value for a colorant wherein the selected element is configured to paint a non-zero value for the colorant;
      configuring the first replacement element with a lighten transparency blend mode;
      configuring a second replacement element to paint the same colorant values as the selected element;
      configuring the second replacement element with a darken transparency blend mode; and
      configuring the second replacement element to paint after the first replacement element.

2. A method for converting a document including vector graphic elements, the method comprising:
   obtaining an ordered list of graphic elements from the document;
   selecting an element from the list;
   removing the selected element from the list;
   adding at least one replacement element for the selected element wherein adding includes:
      configuring the at least one replacement element with the same geometry and position as the selected element;
      configuring transparency attributes associated with the at least one replacement element;
      creating a replacement document based on the modified list;
   wherein selecting comprises selecting an element configured to overprint in a subtractive color space;
   wherein selecting comprises selecting an element configured to paint transparently; and
   wherein adding the at least one replacement element comprises:
      configuring a first replacement element to paint a zero value for a colorant wherein the selected element is configured to paint a non-zero value for the colorant;
      configuring the first replacement element with a lighten transparency blend mode;
      configuring a second replacement element to paint the same colorant values as the selected element;
      configuring the second replacement element with a darken transparency blend mode;
      configuring the second replacement element to paint after the first replacement element;
      configuring the first and second graphic element as part of a transparency group; and
      configuring the transparency attributes of the transparency group based in part on the transparency attributes of the selected element.

3. A method for converting a document including vector graphic elements, the method comprising:
   obtaining an ordered list of graphic elements from the document;
   selecting an element from the list;
   removing the selected element from the list;
   adding at least one replacement element for the selected element wherein adding includes:
      configuring the at least one replacement element with the same geometry and position as the selected element;
      configuring transparency attributes associated with the at least one replacement element;
      creating a replacement document based on the modified list;
   wherein selecting comprises selecting each element from the list wherein any element of the list is configured to paint a spot color; and
   wherein adding the at least one replacement element for the selected element comprises adding a replacement process element.

4. A method according to claim 3 wherein adding the replacement process element comprises configuring the element to paint only process colorants.

5. A method according to claim 4 wherein adding the replacement process element comprises configuring the replacement element to paint the same process colorant values as the selected element wherein the selected element is configured to paint at least one process colorant.

6. A method according to claim 4 wherein adding the replacement process element comprises configuring the replacement element to paint a zero value for a process colorant wherein the selected element is configured to paint only spot colors.

7. A method for converting a document including vector graphic elements, the method comprising:
   obtaining an ordered list of graphic elements from the document;
   selecting an element from the list;
   removing the selected element from the list;
   adding at least one replacement element for the selected element wherein adding includes:
      configuring the at least one replacement element with the same geometry and position as the selected element;
      configuring transparency attributes associated with the at least one replacement element;
   creating a replacement document based on the modified list;
   wherein selecting comprises selecting each element from the list wherein any element of the list is configured to paint a spot color; and wherein adding the at least one replacement element for the selected element comprises first configuring a spot color transparency group for each spot color painted by the document.

8. A method according to claim 7 including configuring the spot color transparency group to paint with a multiply blend mode and isolation attributes.

9. A method according to claim 8 wherein adding the at least one replacement element for the selected element includes adding a replacement spot element to each spot color transparency group.

10. A method according to claim 9 wherein adding the replacement spot element to the spot color transparency group occurs only if the selected element is configured to paint the spot color associated with the transparency group or the selected element is configured to paint transparently or the selected element is configured to knockout.

11. A method according to claim 10 wherein adding the replacement spot element to the spot color transparency group comprises:
configuring the replacement element to paint only the spot color associated with the transparency group; and
configuring the replacement element to disable overprint.

12. A method according to claim 11 including configuring the replacement element to paint the same spot color value as the selected element wherein the selected element is configured to paint the spot color associated with the transparency group.

13. A method according to claim 11 including configuring the replacement element to paint a zero value for the spot color wherein the selected element is not configured to paint the spot color associated with the transparency group.

* * * * *